US 11,144,669 B1
Oct. 12, 2021

(12) United States Patent
Rao

(54) MACHINE LEARNING METHODS AND SYSTEMS FOR PROTECTION AND REDACTION OF PRIVACY INFORMATION

(71) Applicant: Cognitive Ops Inc., Atlanta, GA (US)

(72) Inventor: Krishnaswamy Srinivas Rao, Atlanta, GA (US)

(73) Assignee: Cognitive Ops Inc., Atlanta, GA (US)

( * ) Notice: Subject to any disclaimer, the term of this patent is extended or adjusted under 35 U.S.C. 154(b) by 0 days.

(21) Appl. No.: 17/078,021

(22) Filed: Oct. 22, 2020

Related U.S. Application Data

(60) Provisional application No. 63/038,103, filed on Jun. 11, 2020.

(51) Int. Cl.
| | |
|---|---|
| *G06F 17/00* | (2019.01) |
| *G06F 21/62* | (2013.01) |
| *G06N 20/00* | (2019.01) |
| *G06Q 30/02* | (2012.01) |
| *G06F 16/21* | (2019.01) |
| *G06F 16/25* | (2019.01) |
| *G06N 7/00* | (2006.01) |

(52) U.S. Cl.
CPC ........ *G06F 21/6245* (2013.01); *G06F 16/219* (2019.01); *G06F 16/252* (2019.01); *G06N 7/005* (2013.01); *G06N 20/00* (2019.01); *G06Q 30/0201* (2013.01)

(58) Field of Classification Search
CPC .. G06F 21/6245; G06F 16/219; G06F 40/166; G06F 16/252; G06F 40/169; G06Q 10/10; G06Q 30/0201; G06N 20/00; G06N 7/005
USPC .................... 715/200, 230, 255, 256; 726/27
See application file for complete search history.

(56) References Cited

U.S. PATENT DOCUMENTS

| | | | |
|---|---|---|---|
| 7,475,242 B2 * | 1/2009 | Baird ................. | G06F 21/6218 713/166 |
| 10,481,783 B1 * | 11/2019 | Benkreira ............ | G06F 3/0485 |
| 2007/0094594 A1 * | 4/2007 | Matichuk ............. | G06F 40/253 715/205 |
| 2007/0255755 A1 * | 11/2007 | Zhang .................... | G06F 16/78 |

(Continued)

*Primary Examiner* — Manglesh M Patel
(74) *Attorney, Agent, or Firm* — Cognition IP, P.C.; Edward Steakley; Rajesh Fotedar

(57) ABSTRACT

Methods, systems and computer-program products are directed to a Privacy Engine for evaluating initial electronic documents to identify document content categories for portions of content within the electronic documents, with respect to extracted document structures and document positions, that may include privacy information for possible redaction via visual modification. The Privacy Engine builds a content profile based on detecting information at respective portions of electronic document content that indicate one or more pre-defined categories and/or sub-categories. For each respective portion of electronic document content, the Privacy Engine applies a machine learning model that corresponds with the indicated category (or categories and sub-categories) to determine a probability value of whether the respective portion of content includes data considered likely to be privacy information. The Privacy Engine recreates the one or more initial electronic documents according to one or more privacy information redactions at respective locations of the portions of content.

19 Claims, 10 Drawing Sheets

(56) References Cited

U.S. PATENT DOCUMENTS

| | | | | |
|---|---|---|---|---|
| 2011/0119576 | A1* | 5/2011 | Aumann | G06Q 30/02 715/255 |
| 2016/0004977 | A1* | 1/2016 | Shi | G06N 99/005 706/12 |
| 2016/0350675 | A1* | 12/2016 | Laks | G06N 20/20 |
| 2017/0132528 | A1* | 5/2017 | Aslan | G06N 20/00 |
| 2017/0330056 | A1* | 11/2017 | Merhav | G06N 3/0454 |
| 2018/0285599 | A1* | 10/2018 | Praveen | G06F 21/6254 |

* cited by examiner

300

```
┌─────────────────────────────────────────────────┐
│  Build a content profile based on detecting one │
│  or more categories for various portions of the │──⌒ 302
│                    content                      │
└─────────────────────────────────────────────────┘
                         │
                         ▼
┌─────────────────────────────────────────────────┐
│  For each respective content portion, apply at  │
│  least one machine learning model that          │──⌒ 304
│  corresponds with the indicated category to     │
│  determine a probability of whether the         │
│  respective content portion includes privacy    │
│  information                                    │
└─────────────────────────────────────────────────┘
                         │
                         ▼
┌─────────────────────────────────────────────────┐
│  Recreate the content according to one or more  │──⌒ 306
│         privacy information redactions.         │
└─────────────────────────────────────────────────┘
```

FIG. 3

MACHINE LEARNING METHODS AND SYSTEMS FOR PROTECTION AND REDACTION OF PRIVACY INFORMATION

CROSS-REFERENCE TO RELATED APPLICATIONS

This application claims the benefit of priority of U.S. Provisional Application No. 63/038,103 filed on Jun. 11, 2020, which is hereby incorporated by reference in its entirety and should be considered a part of this specification.

BACKGROUND

Various law and regulations secure privacy rights for consumers and apply to businesses that buy, receive or sell personal consumer information. Such law and regulations grant consumers the right to know, delete and/or opt out of having their personal and private information being collected and used by a business and the right to non-discrimination in price or service based on their privacy choice. Organizations impacted by these law and regulations may be required to respond to requests from consumers to know, delete, and opt-out within specific timeframes. Organization may further have additional record keeping and personnel training obligations under these law and regulations as well.

SUMMARY

Conventional systems exist for sorting content that may include sensitive information, such as private and personal data that is subject to various laws and regulations. However, the administrative and financial costs of compliance to avoid severe penalties mandated by the various laws and regulations are not fully alleviated by conventional systems.

Methods, systems and computer-program products are directed to a Privacy Engine for evaluating initial electronic documents to identify document content categories for portions of content within the electronic documents, with respect to extracted document structures and document positions, for possible redaction of content via visual modification. The Privacy Engine builds a content profile based on detecting information at respective portions of electronic document content that indicate one or more pre-defined categories and/or sub-categories. For each respective portion of electronic document content, the Privacy Engine applies a machine learning model that corresponds with the indicated category (or categories and sub-categories) to determine a probability value of whether the respective portion of content includes data considered likely to be privacy information. The Privacy Engine recreates the one or more initial electronic documents according to one or more privacy information redactions at respective locations of the portions of content.

According to various embodiments, for example, a portion of electronic document content ("a content portion") may be one or more phrases or sentences in a document, a segment of a video frame in a video file and/or a range of time during an audio file. In various embodiments, a content portion may be a document within a plurality of documents and/or be a file within a plurality of files of different formats. The Privacy Engine recreates the one or more of the initial electronic documents to include display of the one or more privacy information redactions. Each recreated electronic document with redactions may then be utilized to generate reports for the internal use by an organization in compliance with various law and regulations and may be utilized to generate a compliant report for delivery to a consumer.

The Privacy Engine reduces the administrative and financial costs of deploying conventional systems while increasing the accuracy of identifying privacy information that should be handled discreetly. By leveraging multiple Natural Language Processing (NLP) models, Named Entity Recognition models and others machine learning techniques to recognize privacy information included within unstructured content, the Privacy Engine provides a customizable solution that improves the accuracy of privacy information detection while still allowing for human activity in a privacy engine feedback loop to review/approve the redacted content and to further train the Privacy Engine based on detected privacy information and the review/approval activity of one or more human reviewers.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 3 is a diagram illustrating an exemplary method that may be performed in some embodiments.

DETAILED DESCRIPTION

Figure 1:
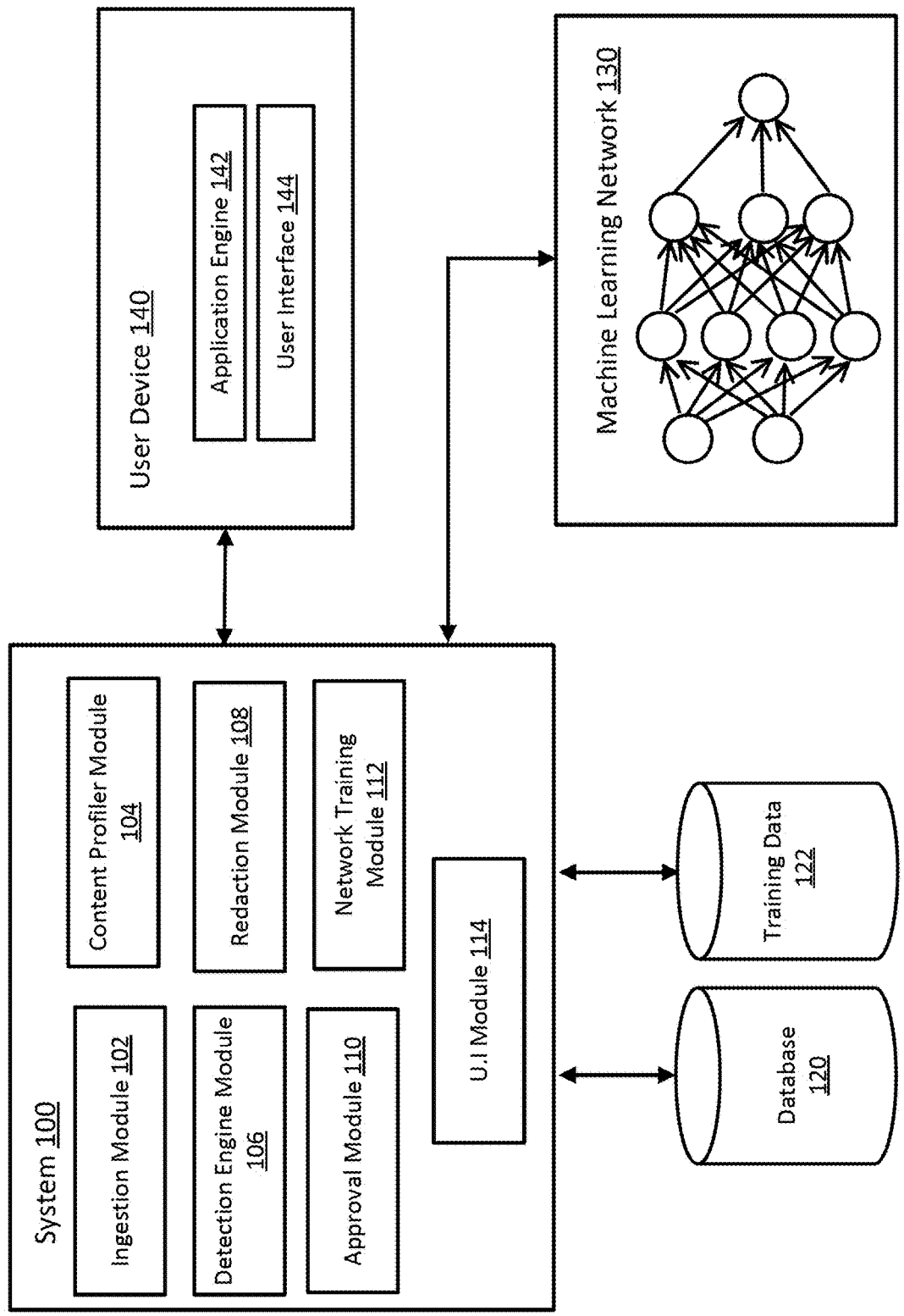
FIG. 1 is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 is a diagram illustrating an exemplary environment in which some embodiments may operate. FIG. 1 illustrates a block diagram of an example system 100 of the Privacy Engine for training a machine learning network 130 with input training database 122. The system 100 includes an ingestion module 102, a content profiler module 104, a detection engine module 106, a redaction module 108, an approval module 110, a network training module 112 and a user interface module 114. The system 100 may communicate with a user device 140 to display output, via a user interface 144 generated by an application engine 142. The machine learning network 130 and the databases 120, 122 may further be components of the system 100 as well. In various embodiments, a database 120 may include various types of structured and unstructured content, customer identifiers, extracted structural attributes and/or human reviewer activity and approval decisions.

Figure 2:
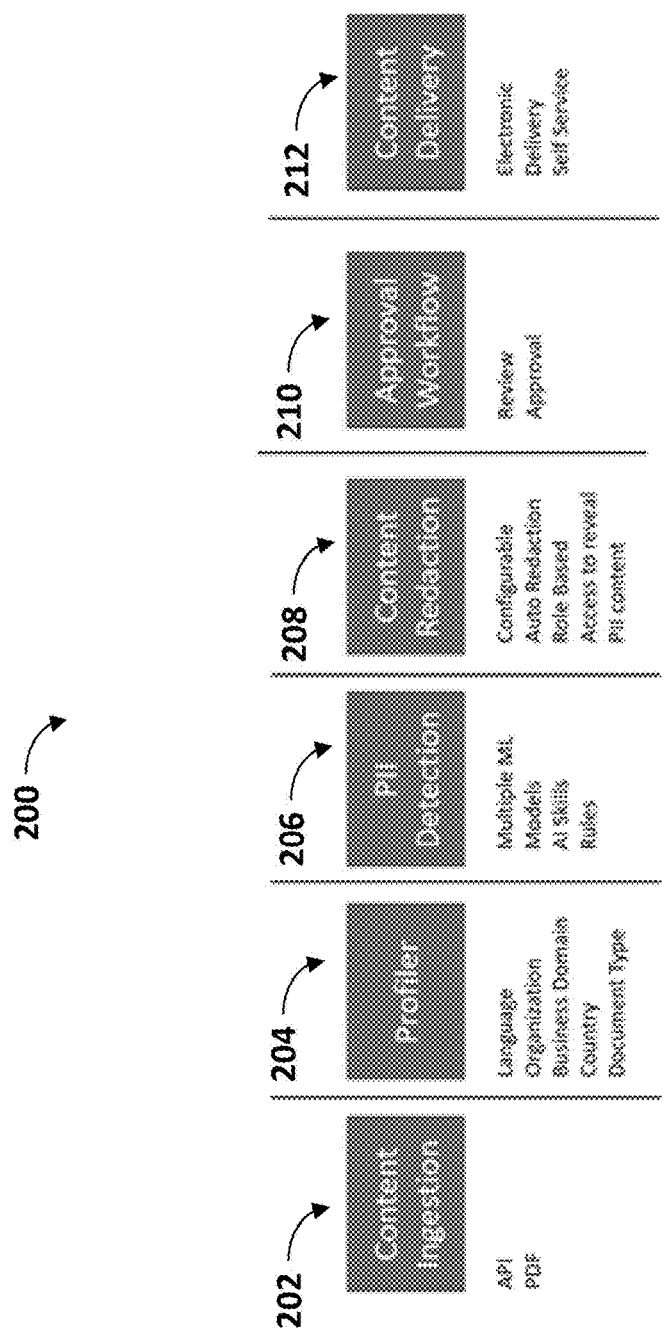
FIG. 2 is a diagram illustrating an exemplary method that may be performed in some embodiments.
Figure 4:
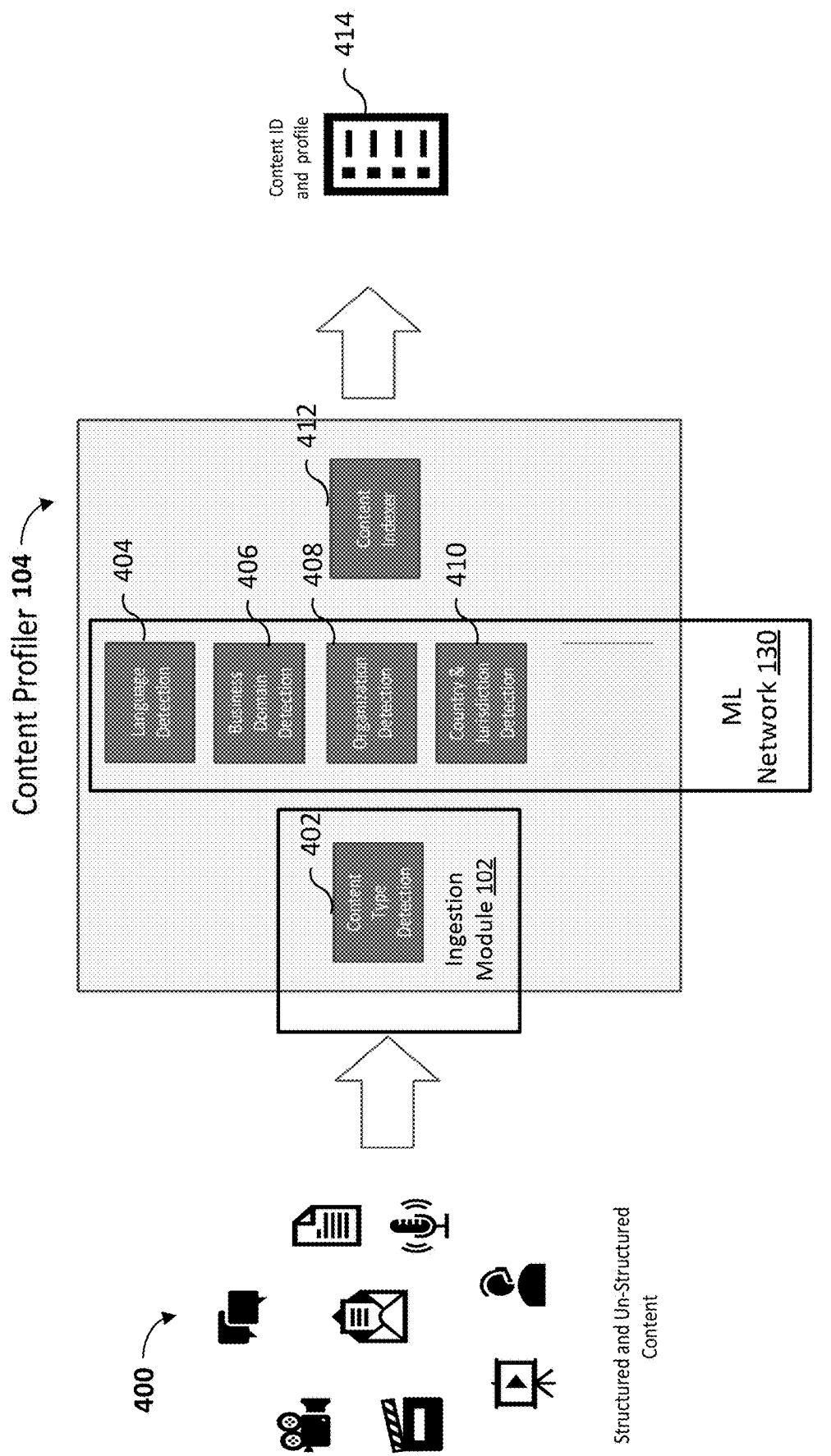
FIG. 4 is a diagram illustrating an exemplary environment in which some embodiments may operate.

The ingestion module 102 of the system 100 may perform functionality as illustrated in FIGS. 2, 3 and 4.

The content profiler module 104 of the system 100 may perform functionality as illustrated in FIGS. 2, 3 and 4.

Figure 5:
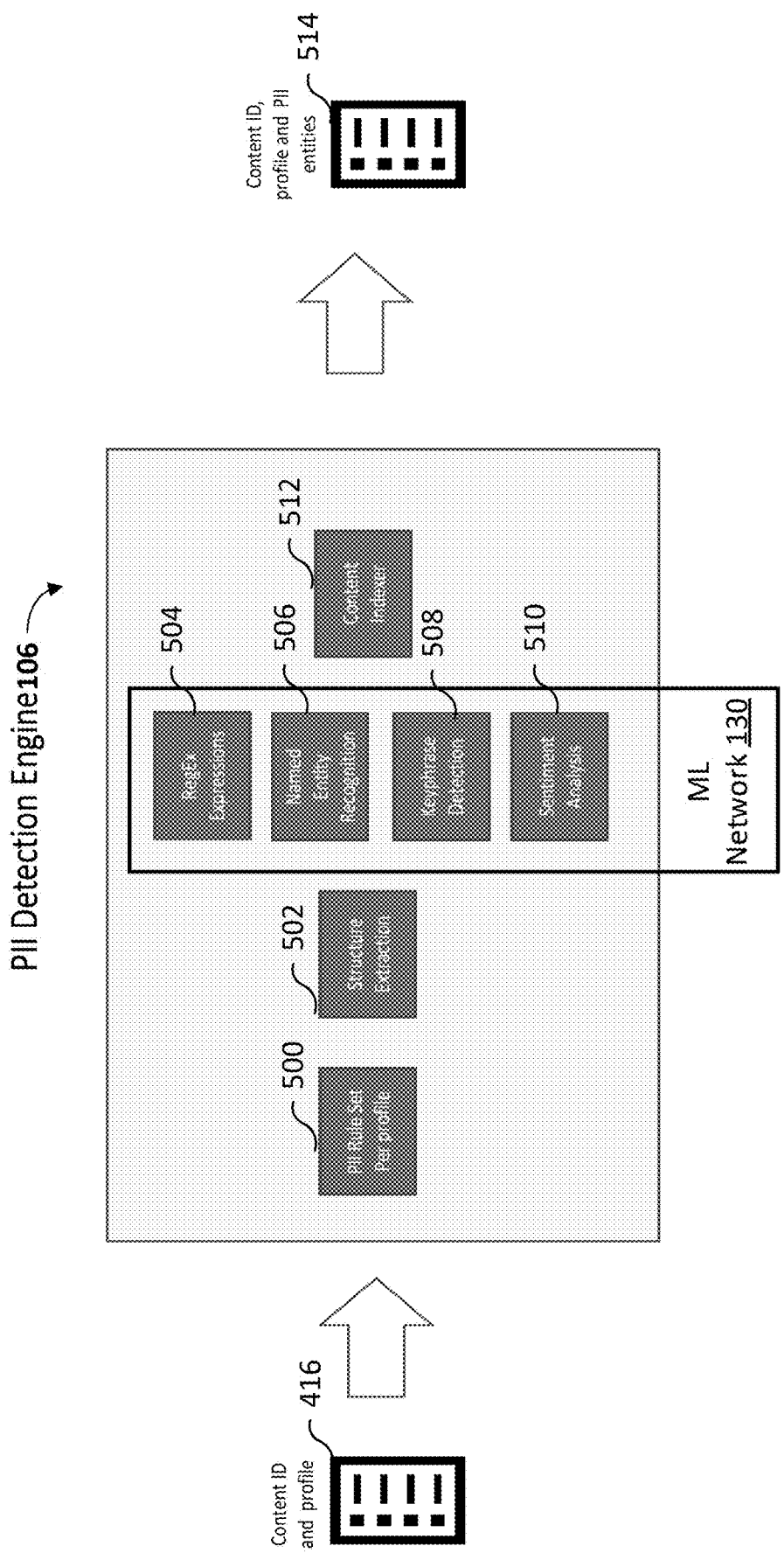
FIG. 5 is a diagram illustrating an exemplary environment in which some embodiments may operate.

The detection engine module 106 of the system 100 may perform functionality as illustrated in FIGS. 2, 3 and 5.

The redaction module 108 of the system 100 may perform functionality as illustrated in FIGS. 2, 3, 5, 6, 7, 8 and 9.

The approval module 110 of the system 100 may perform functionality as illustrated in FIGS. 2, 3, 6, 7, 8 and 9.

The network training module 112 of the system 100 may perform functionality in order to train the machine learning network 130 and one or more rule sets based on data in the one or more databases 120, 122.

While the databases 120, 122 are displayed separately, the databases and information maintained in a database may be combined together or further separated in a manner the promotes retrieval and storage efficiency and/or data security.

The user interface (U.I.) module 114 of the system 100 may perform functionality as illustrated in FIGS. 2, 3, 6, 7, 8 and 9.

Embodiments may be used on a wide variety of computing devices in accordance with the definition of computer and computer system earlier in this patent. Mobile devices such as cellular phones, smart phones, PDAs, and tablets may implement the functionality described in this patent.

As shown in flowchart 200 of FIG. 2, according to various embodiments, the Privacy Engine ingests content associated with a user, such as a content that is associated with a pre-assigned customer identifier (Act 202). The Privacy Engine receives the electronic documents, that include content portions of unstructured text, structured text, image content, audio content and/or video content. The Privacy Engine stores the received electronic documents in a data store device. The Privacy Engine builds a content profile according to indicated categories for portions of the content (Act 204). According to various embodiments, the Privacy Engine evaluates the one or more initial electronic documents to build a content profile based on detecting information at the respective portions of content that indicates one or more pre-defined categories. For example, a first portion of an electronic document may refer to a type of business domain and a second portion of the electronic document may refer to a geographic location. Both the first and second electronic document portions may be in a particular language. The content profile includes a business domain category for the first document portion, a geographic category for the second document portion and a language type category for the electronic document.

The Privacy Engine inputs each respective portion of content into an ML Model that corresponds with the portion of content's indicated category in order to detect various instances of privacy information (Act 206). According to various embodiments, for each respective portion of electronic document content, the Privacy Engine applies at least one machine learning model that corresponds with it's indicated category to determine a probability value of whether the portion of content includes data considered likely to be privacy information. The probability value further indicates whether the data at the portion of content may be privacy information that needs to be redacted from a corresponding electronic document.

The Privacy Engine generates a version of the document according to a redaction for each occurrence of privacy information that has a ML Model-generated probability value indicating a need for redaction (Act 208). According to various embodiments, the Privacy Engine recreates the one or more initial electronic documents according to one or more privacy information redactions at respective document locations of portions of content. The Privacy Engine visually modifies a document location of each occurrence of privacy information such that the privacy information is obscured from view. The Privacy Engine displays the redacted versions of the electronic documents.

The Privacy Engine includes approval workflow functionality for a document reviewer to select a redacted portion of the document to provide approval or rejection of the select redacted portion (Act 210). Upon selection of the redacted portion, the privacy information of the corresponding portion of content associated with the selected redaction is included in display of the version of the electronic document. The document reviewer may input into the Privacy Engine data that indicates whether the selected redaction is associated with data at the corresponding portion of content that was correctly identified as privacy information or whether the selected redaction is associated with data correctly identified as privacy information but mistakenly identified as to a type of privacy information. In addition, the document reviewer may input data indicating the selected redaction is approved as being correctly associated with privacy information. The input data of the document may be used in a feedback loop of the Privacy Engine to update training data of any of the ML Models available via the Privacy Engine and to build additional ML Models to be later deployed in the Privacy Engine. The Privacy Engine further provides for delivery (or transmission) of a final version of the electronic document(s) based on approved redacted portions (Act 212).

According to various embodiments, a customer of an organization may request a report of all the customer's personal and private information retained by the organization. The organization identifies a collection of electronic documents associated with the customer and evaluates content portions within the collection of electronic documents to determine one or more pre-defined categories indicated by the information in the evaluated content portions. For example, the collection of electronic documents may include financial records of the customer, that includes account numbers, social security numbers, monetary amounts, personal contact information and various types of financial transactions in multiple different countries. The Privacy Engine deployed by the organization thereby determines that the pre-defined categories indicated by the information in the collection of electronic documents include, for example, a type of financial industry business domain as well as multiple geographic domains as a result of the financial transactions being related to different countries.

Given the one or more indicated pre-defined categories associated with the financial records of the customer, the Privacy Engine selects one or more machine learning models that correspond to the pre-defined categories. For example, a machine learning model for a specific region that includes a country involved in a financial transaction may enforce one or more privacy rules and regulations with respect to the type of information in the customer's financial records. The machine learning model receives input data based one or more portions of content from the collection of electronic documents and identifies those portions of content that include data (i.e. account numbers, social security numbers, monetary amounts, personal contact information and various types of financial transactions) that are likely to be identified as personal and private information subject to the privacy rules and regulations of the specific region. For portions of content identified as including possible personal and private information, the Privacy Engine returns a probability value generated by the selected machine learning model that corresponds to the pre-defined category for the specific region.

The Privacy Engine identifies structural attributes of the electronic documents to identify document positions of the personal and private information that corresponds to the probability values of the selected machine learning model that corresponds to the pre-defined category for the specific region. The Privacy Engine redacts the identifies document positions and recreated the collection of the financial records such that the personal and private information are redacted at the identified document positions. The Privacy Engine may then generate a report for the requesting customer that identifies the types of personal and private information retained by the organization but the report itself may include the redactions to avoid inadvertent of the customer's actual personal and private information.

As shown in flowchart 300 of FIG. 3, the Privacy Engine builds a content profile based on detecting one or more categories for various portions of the content (Act 302). In various embodiments, the Privacy Engine determines (or receives) a customer identifier associated with the content in electronic documents and identifies a format of the electronic documents during a content ingestion phase. For example, the Privacy Engine may determine if content of an electronic document is an image, unstructured content, an audio file or a video file. The Privacy Engine may tag each portion of electronic document content according to its format along with the customer identifier.

For each respective content portion of an electronic document, the Privacy Engine applies at least one machine learning model that corresponds with its indicated category to determine a probability of whether the respective content portion includes privacy information (Act 304). In various embodiments, a detected category may be a pre-defined category of one or more of: a language category, a business domain category, an organizational category and a geographic category. For example, the geographic category may indicate a jurisdiction from which one or more data privacy laws will be applied to the content in the electronic documents. Each pre-defined category may further include detected sub-categories. For example, one or more sub-categories may be: a language type(s), a business domain type(s), an organization type(s) and a geographic region(s) or location(s).

In various embodiments, prior to sending a respective content portion of an electronic document to the machine learning network 130, the Privacy Engine extracts one or more structural data and attributes of the respective content portion. For example, the Privacy Engine detects structural data associated with the corresponding electronic document based on one or more of: a sentence position, a document section, a header, a footer, a paragraph and a document table. The Privacy Engine thereby identifies a placement (or document position) of the respective content portion based in part on the extracted structural data.

After structural extraction, the Privacy Engine stores the detected structural data in a database 120 and sends input based on the data at the respective content portion to a machine learning model in the machine learning network 130 that corresponds to the pre-defined category of the respective content portion. The Privacy Engine receives a probability value (or confidence score), generated by the machine learning network 130. The probability value indicates a likelihood that data detected at the respective content portion likely contains privacy information.

The Privacy Engine recreates the content according to one or more privacy information redactions (Act 306). In various embodiments, the Privacy Engine locates a document position of the privacy information detected in data at the respective content portion based on the stored structural data and attributes of the corresponding electronic document. The Privacy Engine thereby identifies the document position as a portion of the electronic document to be visually modified (i.e. obscured, blacked out, deleted, hidden). The Privacy Engine generates a version of the electronic document with the visually modified document position such that the privacy information detected in data at the respective content portion is no longer visible and/or obscured.

The Privacy Engine displays the version of the electronic document with the visually modified document position. During a workflow approval phase, a human reviewer may select the visually modified document position while the recreated version of the electronic document is displayed. In response to the human reviewer selection, the Privacy Engine replaces the selected visually modified electronic document position with a display of the data of the portion of content that originally appeared at the document position.

In various embodiments, the human reviewer may provide an approval or rejection of the selected redaction. A rejection indicates the redaction corresponds to data that was incorrectly identified as privacy information or that the redaction corresponds to a different type privacy information. An approval indicates the redaction corresponds to data that is privacy information and that the redaction is appropriate. The human reviewer's approvals and rejections (and the corresponding redactions and data at the content portions) may be fed back into the Privacy Engine to build and train a machine learning model to be added to the machine learning network 130 and/or to tune how the Privacy Engine selects current machine learning model for one or more detected pre-defined categories and/or to be applied to future content portions.

According to various embodiments, privacy information may be based on one or more of the following: a personal identifier (such as name and address), device and online identifiers and related information, such as—for example—a telephone number, an email address, online activity, application activity, network activity, and/or a government identifier. Online/application/network activity may be a cookie and/or browsing history. A government identifier may be a national identification number (such as a passport number or social security number) and/or a driver's license number.

Privacy information may be based on geographic information, such as age and date of birth. Privacy information may be based on financial information, such as credit/debit card numbers and/or claims information. Privacy information may be based on health and health insurance information, such as prescription numbers and health insurance identification numbers Privacy information may be based on protected classifications under state or federal law, such as gender and nationality. Privacy information may be based on purchase history information, such as products purchased, rented and/or returned by a user. Privacy information may be based on biometric information, such as imagery of the iris, retina, and/or fingerprints. Privacy information may be based on location information, such as geo-location information.

Privacy information may be based on audio, image, visual and/or other sensory-based information (such as audio or video recordings). Privacy information may be based on employment information, such as occupation, title, licenses and/or professional memberships Privacy information may be based on background and criminal information, such as background checks, credit scores and/or criminal convictions. Privacy information may be based on education information, such as college/graduate school degrees and/or schooling information. Privacy information may be based on individual preferences and characteristics, such as inferences related to shopping patterns and behaviors of a user.

It is understood that some of the acts of the exemplary methods 200, 300 may be performed in different orders or in parallel. Also, the acts of the exemplary methods 200, 300 may occur in two or more computers in a networked environment. Various acts may be optional. Some acts may occur on a local computer with other acts occurring on a remote computer.

As shown in FIG. 4, structured and/or unstructured content 400 may be uploaded to and ingested via the ingestion module 102. The content 400 may include one or more of any type of content format, such as: an unstructured document, a structured document, an email, an audio file, a video file, an audio recording, an audio recording transcript, and/or a presentation. The ingestion module detects the various types of content formats of the content 400 and tags the content as being associated with one or more customer identifiers. In various embodiments, the content 400 include one or more initial electronic documents and/or content portions from the one or more initial electronic documents.

The content profiler module 104 receives the tagged content 400 whereby content portions may each be an individual file amongst the tagged content 400 or various segments of each individual file amongst the tagged content 400. The content profiler module 104 accesses one or more machine learning models 404, 406, 408, 410 in the machine learning network 130 to detect pre-defined categories and sub-categories of the content portions in the uploaded content 400.

The one or more machine learning models 404, 406, 408, 410 parse the content portions 400. For each example, a machine learning model 404 for language detection may identify which type of language is used in each content portion, a file or electronic document in the content 400 or in the uploaded content 400 in its entirety. A machine learning model 406 for business domain category detection may identify a field (or type) of business that is related to a content portion. For example, the machine learning model 406 for business domain detection may identify a electronic document (or a portion of an electronic document) that includes various types of symbols, phrases or account number sequences that detects a likelihood that the respective content portion is a financial documents (such as bill, a bank statement or a financial disclosure document).

A machine learning model 408 for organization category detection may identify a business organization that is a source of a content portion or a recipient of the content portion. For example, machine learning model 408 for organization category detection may identify an electronic document (or a portion of the electronic document) that includes unique organizational terms, organizational statistics/data, personnel names, addresses, logos, colors, product names and/or service names. A machine learning model 410 for geographic category detection may be directed to countries, regions and/or jurisdictions. The machine learning model 410 for geographic category detection may identify whether an electronic document (or a n electronic document portion) may be subject to (or not subject to) various privacy laws, data handling laws, data maintenance laws and/or data storage laws for one or more countries and/or one or more jurisdictions. For example, machine learning model 410 for geographic category detection may identify an electronic document (or a portion of an electronic document) that includes symbols, numbers, graphics and/or phrases that correlate with legal requirements arising under laws of one or more jurisdictions. According to various embodiments, the machine learning model 410 for geographic category detection may detect that an electronic document (or a portion of an electronic document) may be subject to legal requirements from multiple jurisdictions.

It is understood that in addition to the machine learning models 404, 406, 408, 410, the content profiler module 104 may apply one or more rules-based systems/techniques to identify various types of content that have one or more content portions that match a rule(s) that correlates with a particular pre-defined category and sub-category (i.e. language, business domain, organization, geographic). The content profiler module 104 further includes a content indexer 412 that builds an index 414 that includes an association for each content portion of the uploaded content 400 and one or more of the detected pre-defined categories and sub-categories for that respective content portion. For example, the content indexer 412 may indicate that a first portion of content indicates categories for a financial document in the French language and subject to the General Data Protection Regulation (GDPR) of the European Union. It is understood that other types of business domain pre-defined categories include categories for: a medical record document, a human resources department document, a government entity document, an educational record document and/or a purchase order document. The content indexer 412 may further indicate that a second portion of content may be a part of a video call file (such as a particular time range during the video call) for pre-defined categories for the English language and subject to various privacy and data protection laws of the United States and one or more individual state governments.

As shown in FIG. 5, the detection engine module 106 receives as input the index 414 generated at the content profiler module 104. The detection engine module 106 includes a rule set 500 that includes rules to select one or more machine learning models 504, 506, 508, 510 from the machine learning network 130 based on a respective content portion's indicated pre-defined categories (and sub-categories) as listed in the index 414. For example, a machine learning model 506 for named entity recognition may be trained by the network training module 112 for identifying whether data at portions of electronic document content may likely include various types of privacy information that typically appear in various types of documents related to a first particular organization. However, there may also be an additional machine learning model for named entity recognition trained for identifying whether data at portions of electronic document content may likely include various types of privacy information that typically appear in various types of documents related to a second particular organization—where the first and second particular organizations are different than each other. Moreover, the training data 122 used to train the machine learning model 506 for named entity recognition and additional machine learning model for named entity recognition may be the same in some respects and may be different in some respects as well.

A machine learning model 508 for keyphrase detection may be trained by the network training module 112 for identifying whether data may likely include various types of privacy information that typically appear in various types of documents subject to privacy laws in a first jurisdiction. However, there may also be an additional machine learning model for keyphrase detection trained for identifying whether data may likely include various types of privacy information that typically appear in various types of documents subject to privacy laws in a second jurisdiction—where the first and second particular jurisdictions (and their respective privacy laws and compliance requirements) are different than each other. Moreover, the training data 122 used to train the machine learning model 505 for keyphrase detection and additional machine learning model for keyphrase detection may be the same in some respects and may be different in some respects as well.

It is further understood that the rule set 500 may be continuously updated based on human reviewer rejection and approval decisions such that the rule set 500 (as it becomes continuously updated) gets tuned to select more appropriate machine learning models 504, 506, 508, 510 for the detected categories of any given content portion. The machine learning models 504, 506, 508, 510 may employ, according to non-limiting examples, RegEx expression machine learning techniques, named entity recognition techniques, natural language processing techniques, keyphrase detection techniques and/or sentiment analysis.

The detection engine module 106 includes a structure extraction module 502 that analyzes a content portion for one or more structural data and attributes. For example, if an electronic document includes structural elements, such as a header, a paragraph break(s), a footer and a table, the structure extraction module 502 may identify the structural elements and build a coordinate mapping of the identified structural elements with respect to positions within the electronic document and identify where the content portion is located with respect to the identified structural elements and the various document positions. The structure extraction module 502 stores the structural data and attributes, for each content portion, in a database 120.

The detection engine module 106 passes each content portion to one or more machine learning models 504, 506, 508, 510 selected according to the rule set 500 and the respective content portion's indicated pre-defined categories (and sub-categories). In various embodiments there may be multiple machine learning models 504, 506, 508, 510 selected to be applied to a respective content portion according to an order specific to that respective content portion due to the one or more indicated pre-defined categories. The machine learning models generate probability values related to data at a respective content portion that may represent a likelihood that the data may be one or more types of privacy information subject to redaction.

The detection engine module 106 includes a content indexer module 512 that builds an index 514 that identifies—for each content portion—the indicated pre-defined categories (and sub-categories), one or more occurrences of the various types of privacy information identified by the machine learning models and the associated probability value(s) for each type of identified privacy information. The redaction module 108 receives the index 514 and accesses the structural data and attributes stored in the database 120. The redaction module 108 generates a version of the content (such as an electronic document) based on its content portions (e.g. electronic document portions), the corresponding stored structural data and attributes for the content portions and the identified likely privacy information based on data at each content portion. The redaction module 108 generates a version of the content with redactions of the privacy information mapped to the structural attributes. In various embodiments, if the content is a financial document based on one or more document portions with data that is privacy information located within a header and a table, the redaction module 108 generates a version of the financial document such that the privacy information is visually modified (i.e. concealed, obscured, deleted)—and such visual modification is perceivable at a document position of the privacy information as mapped according to the financial document's extracted structural data and attributes. For example, if the financial document header includes an account number that one or more machine learning models identified as privacy information, the redaction module 108 generates the version of the financial document with the account number privacy information redacted at the document position of the header (as represented by the extracted structural data and attributes).

Figure 6:
FIG. 6 illustrates an exemplary user interface that may be used in some embodiments.

As shown in FIG. 6, the user interface module 114 generates a user interface 144-1 for display to a human reviewer(s) accessing the Privacy Engine via the approval module 110 for performance of a workflow approval phase. The user interface 144-1 provides a listing 600 of redacted versions of content (such as one or more electronic documents with redacted privacy information) that are queued for review and approval/rejection by the human reviewer(s). The user interface 144-1 provides a listing 602 of redacted versions of content that have been rejected by the human reviewer(s). It is understood that rejections may be a rejection of an entire version of content or specifically rejections of one or more redactions. The user interface 144-1 provides a listing 604 of redacted versions of content that have been reviewed by the human reviewer(s) with a first current range of time. The user interface 144-1 provides a listing 606 of redacted versions of content that have been approved by the human reviewer(s) within a second current range of time. It is understood that approvals may an approval of an entire version of content or specifically approvals of one or more redactions. In addition, according to various embodiments, it is understood that the approval module 110 feeds the approvals and the rejections back into the database 120 and/or training data 122 for use by the network training module 112 to tune the rule set 500 to improve machine learning model selection with regard to indicated pre-defined categories (and sub-categories), to train the machine learning network 130 to better identify data at portion of content as privacy information and/or to build new machine learning models to be later deployed in the machine learning network 130 for use by the content profiler module 104 and/or the detection engine module 106.

Figure 7:
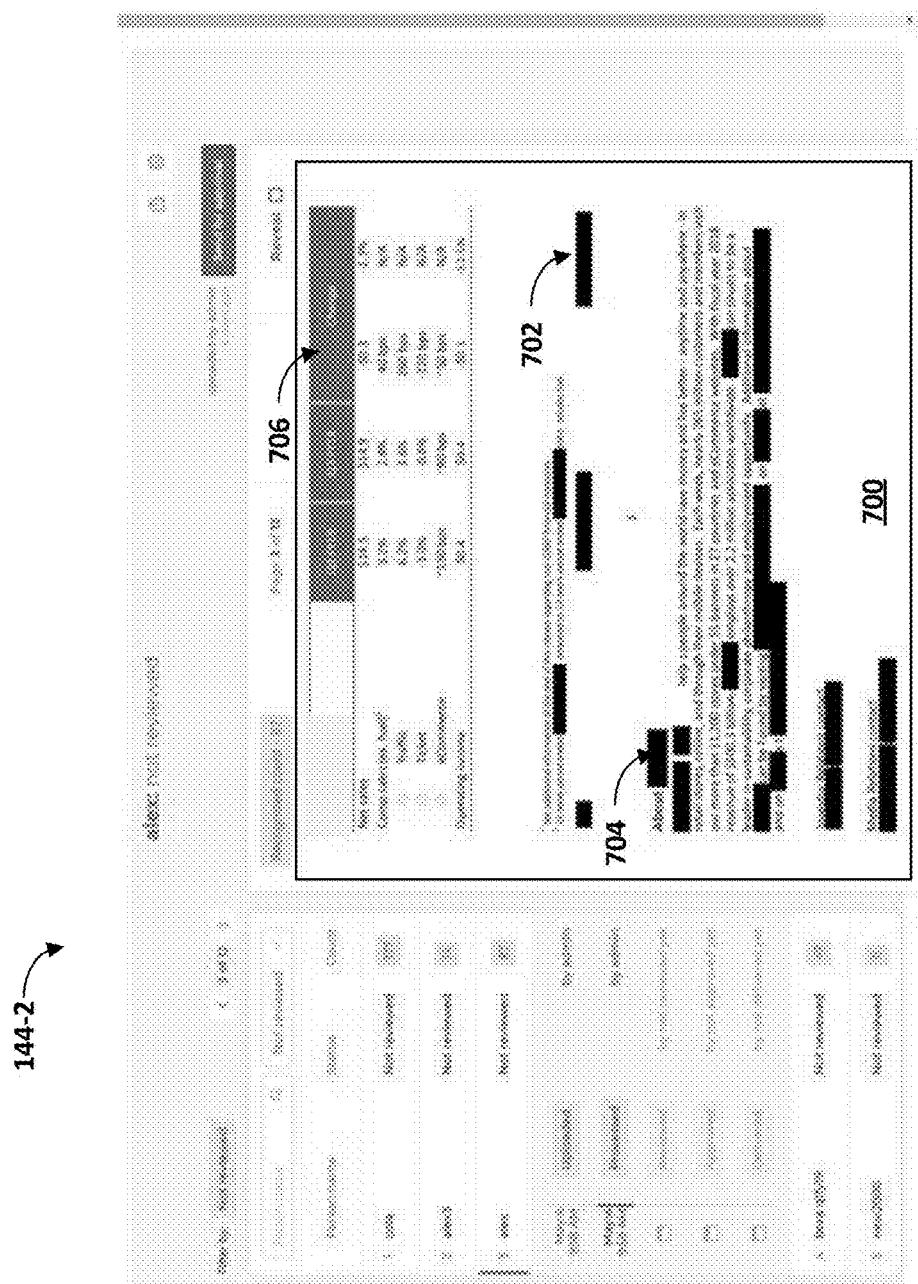
FIG. 7 illustrates an exemplary user interface that may be used in some embodiments.

As shown in FIG. 7, the user interface module 114 generates a user interface 144-2 for display to a human reviewer(s) accessing the Privacy Engine via the approval module 110 for performance of a workflow approval phase. The user interface 144-2 displays a version of an organizational document 700 generated by the redaction module 108 that includes various blacked out redactions 702, 704 of privacy information identified by select machine learning models 504, 506, 508, 510. The redaction module 108 placed the redactions 702, 704 at respective document positions represented by stored extracted structural attributes of the organizational document 700 that map to the privacy information. Although not specifically identified by unique reference numerals, the version of the organizational document 700 includes a plurality of redactions. It is understood that the redactions 702, 704 (and other illustrated redactions) conceal privacy information that includes unique organizational terms, organizational statistics/data, personnel names, addresses, logos, colors, product names and/or service names. As discussed above, the machine learning network 130 may have one or more machine learning models trained on training data 122 specific to the unique organizational terms, organizational statistics/data, personnel names, addresses, logos, colors, product names and/or service names. In addition, it is understood that the organization document 700 includes a table 706 as a structural element and the redaction module 108 would place redactions in the table 706 to obscure any privacy information identified as occurring within a document position that maps to a placement within the table 706.

Figure 8:
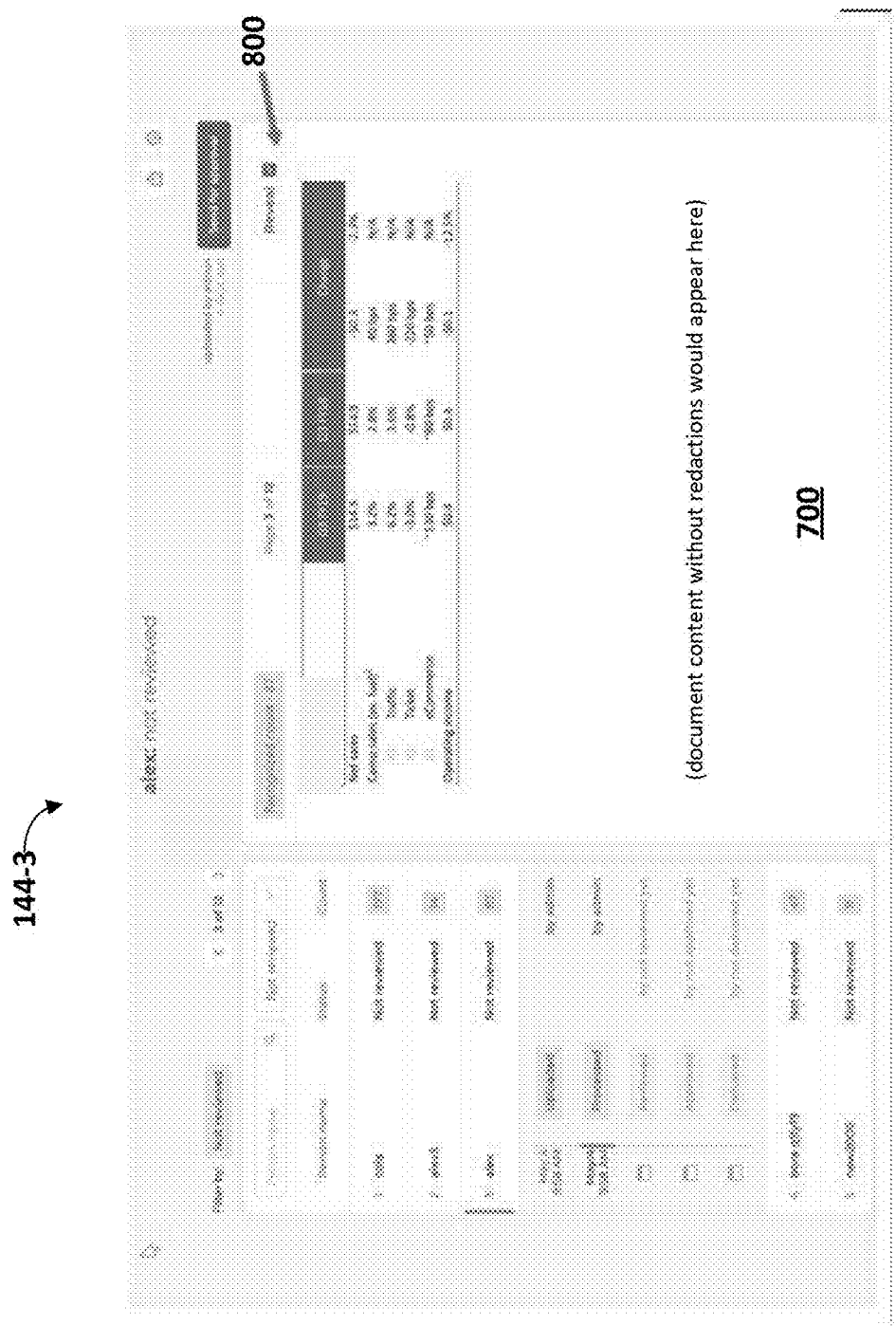
FIG. 8 illustrates an exemplary user interface that may be used in some embodiments.

As shown in FIG. 8, the user interface module 114 generates a user interface 144-3 for display to a human reviewer(s) accessing the Privacy Engine via the approval module 110 for performance of a workflow approval phase. The user interface 144-3 includes a reveal functionality 800 that, upon selection by a human reviewer(s), removes one or more redactions from the displayed organizational document 700 to provide the human reviewer(s) a view of the redacted privacy information. When the human reviewer(s) deselects the reveal functionality 800, display of the organizational document's 700 redactions will reappear.

Figure 9:
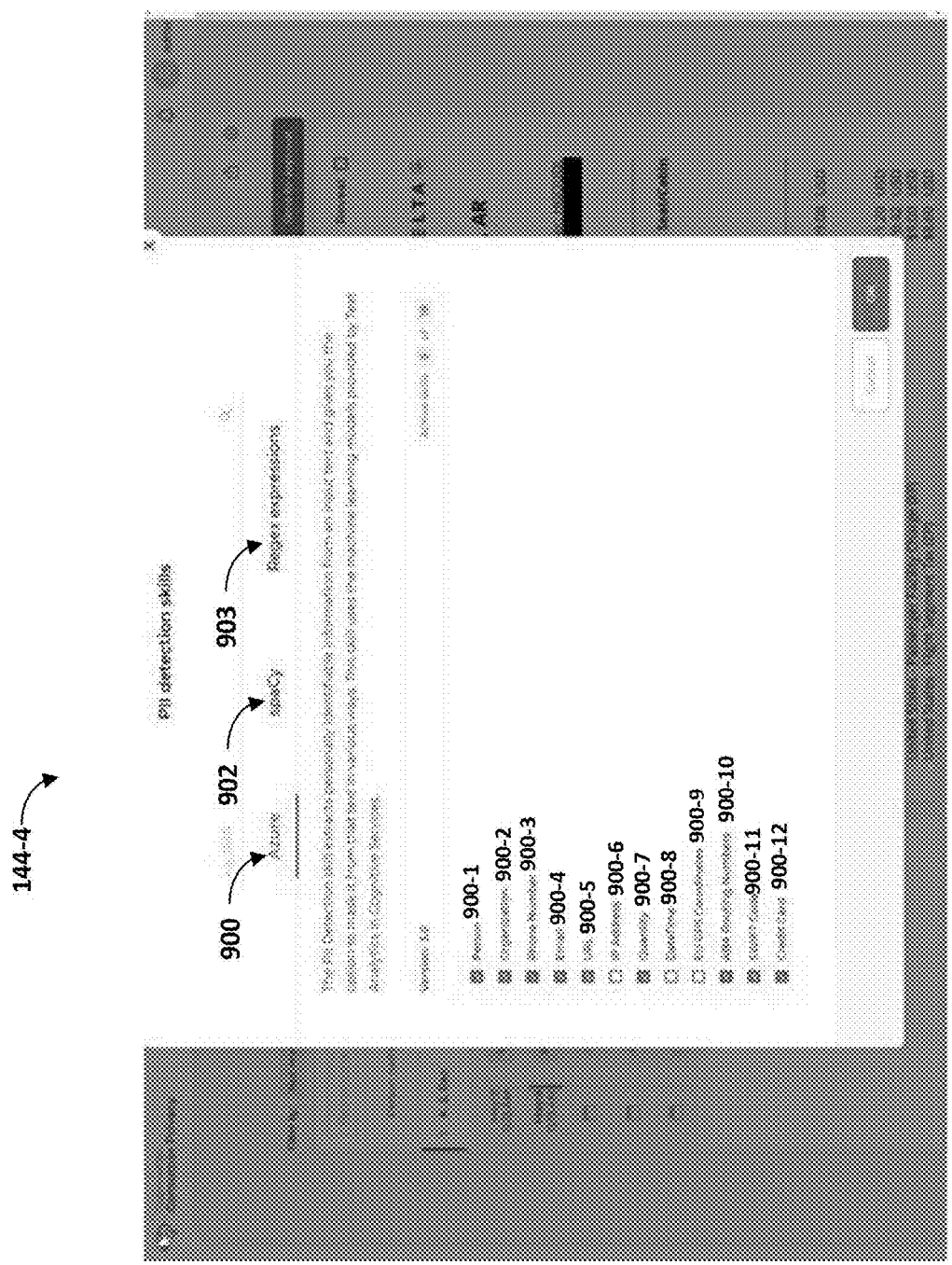
FIG. 9 illustrates an exemplary user interface that may be used in some embodiments.

As shown in FIG. 9, the user interface module 114 generates a user interface 144-4 for display to a human reviewer(s) accessing the Privacy Engine via the approval module 110 for performance of a workflow approval phase. The user interface 144-4 lists which different machine learning models 900, 902, 903 were selected to identify privacy information in the organizational document 700. The user interface 144-4 lists each type of privacy information identified by each machine learning model. For example, the user interface 144-4 list each type of privacy information 900-1, 900-2, 900-3, 900-4, 900-5, 900-6, 900-7, 900-8, 900-9, 900-10, 900-11, 900-12 identified by a first machine learning model 900 and redacted by the redaction module 108. The user interface 144-4 allows the human reviewer(s) to approve some redactions of privacy information 900-1, 900-2, 900-3, 900-4, 900-5, 900-7, 900-8, 900-10, 900-11, 900-12 and rejection some redactions of privacy information 900-6, 900-9. The selected approvals and rejections are stored in the database 120 by the approval module and the redaction module 108 recreates an updated version of the organizational document 700 to include only approved redactions of privacy information 900-1, 900-2, 900-3, 900-4, 900-5, 900-7, 900-8, 900-10, 900-11, 900-12 and to allow the privacy information 900-6, 900-9 for rejected redactions to be visible in the updated version of the organizational document 700.

Figure 10:
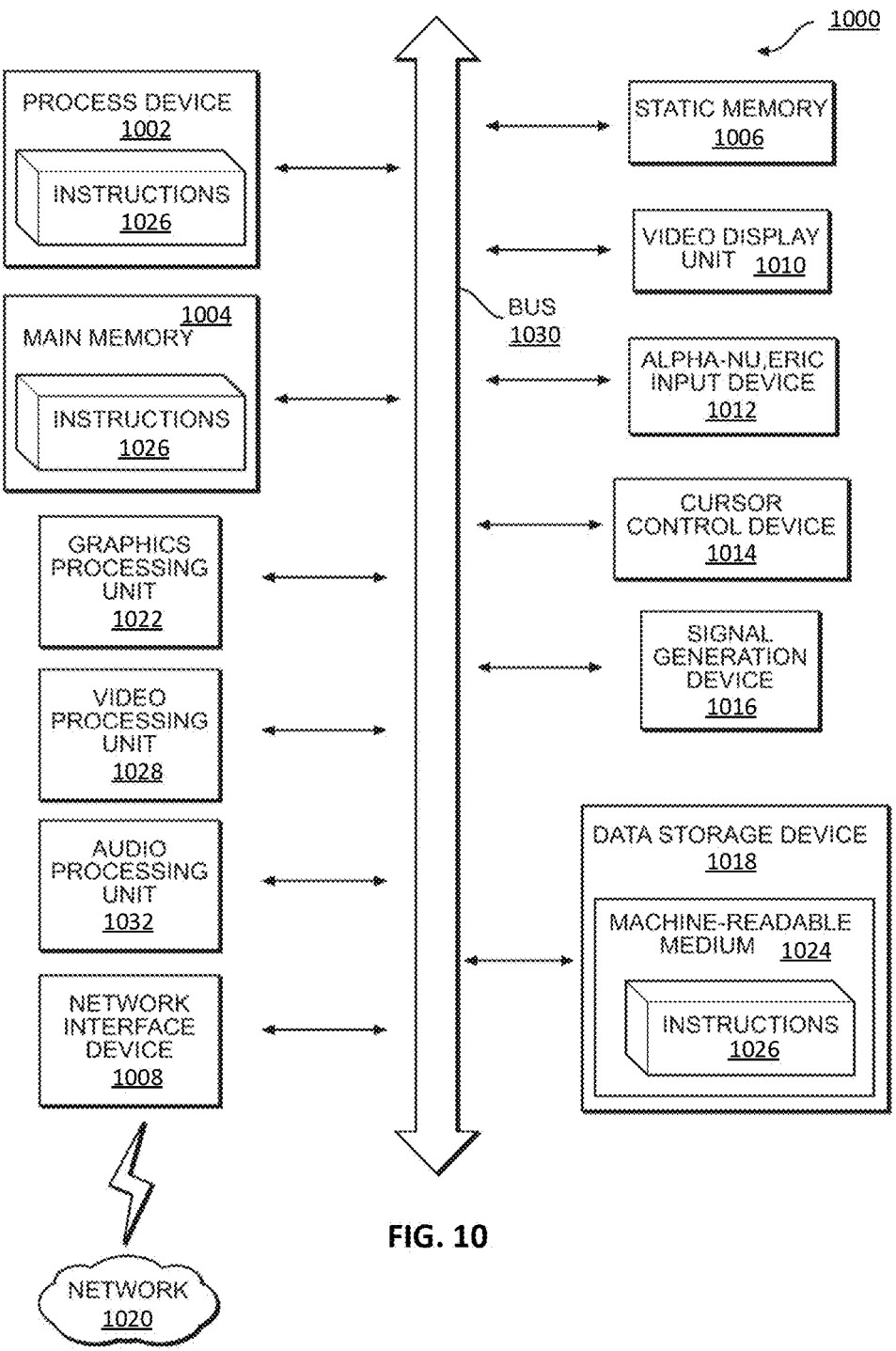
FIG. 10 is a diagram illustrating an exemplary environment in which some embodiments may operate.

FIG. 10 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a computer-readable medium) on which is stored one or more sets of instructions or software 1026 embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In one implementation, the instructions 1026 include instructions to implement functionality corresponding to the components of a device to perform the disclosure herein. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
   receiving one or more initial electronic documents, the electronic documents including respective portions of content comprising textual or audio data;
   storing the received one or more initial electronic documents in a data store device;
   evaluating the one or more initial electronic documents to build a content profile based on detecting information at one or more of the respective portions of content that indicates a pre-defined category, from a plurality of different types of pre-defined categories, that corresponds to each of the one or more respective portions of content;
   for each respective portion of content, applying at least one machine learning model that corresponds with the indicated pre-defined category of the respective portion to determine a probability value of whether the respective portion of content includes data considered likely to be privacy information, wherein a first type of machine learning model that corresponds with a first pre-defined type of category indicated for a first portion of content differs from a second type of machine learning model that corresponds with a second pre-defined type of category indicated for a second portion of content; and
   recreating the one or more initial documents according to one or more privacy information redactions at respective locations of the respective portions of content;

wherein applying at least one machine learning model comprises: applying a pre-determined machine learning model for a financial business domain category to a header portion of a particular electronic document that includes content indicative of the financial business domain;

wherein determining a probability value comprises: determining, via applying the pre-determined machine learning model for the financial business domain category, a first probability value of whether the content in the header portion is considered to be financial privacy information;

wherein recreating the one or more initial documents according to one or more privacy information redactions comprises: generating a version of the particular electronic document to include a visual modification at a document position of the header portion, the visual modification obscuring the content indicative of the financial business domain.

2. The computer-implemented method of claim 1, wherein the one or more categories comprise:
a language category, a business domain category, an organizational category and a geographic category.

3. The computer-implemented method of claim 2, wherein evaluating the one or more initial electronic documents to build a content profile based on detecting information at the respective portions of content that indicates one or more pre-defined categories comprises:
determining a customer identifier associated with the one or more initial electronic documents;
identifying a format for each initial electronic document prior to determining the one or more indicated pre-defined categories; and
upon determining the one or more indicated pre-defined categories, creating an association between each respective portion of content, the respective portion of content's one or more indicated categories and the customer identifier.

4. The computer-implemented method of claim 1, wherein applying at least one machine learning model that corresponds with the indicated category comprises:
extracting one or more structural data and attributes of a corresponding electronic document that includes the respective portion of content, wherein the one or more structural data and attributes represent a redaction location; and
sending input based on the respective portion of content to the at least one machine learning model.

5. The computer-implemented method of claim 4, wherein extracting one or more structural attributes comprises:
detecting structural data and attributes based on one or more of: a sentence position, a document section, a header, a footer, a paragraph and a document table; and
wherein sending input to the at least one machine learning model comprises: storing the detected structural data and attributes outside of the machine learning model to pair it with the probability value.

6. The computer-implemented method of claim 5, wherein recreating the one or more initial documents according to one or more privacy information redactions at respective locations of the portions of content comprises:
locating a document position of privacy information based on corresponding portion of content and the stored structural data and attributes
identifying the document position to be visually modified; and
generating a version of the corresponding electronic document with the visually modified document position to obscure the corresponding portion of content.

7. The computer-implemented method of claim 6, wherein generating a version of the corresponding electronic document with the visually modified document position comprises:
displaying the version of the corresponding electronic document with the visually modified document position;
receiving a selection associated with the visually modified document position; and
in response to the selection, replacing the visually modified document position with a display of the corresponding portion of content concurrently with display of the version of the document.

8. The computer-implemented method of claim 1, wherein the content indicative of the financial business domain comprises a financial account number.

9. A system comprising:
one or more processors; and
a non-transitory computer readable medium storing a plurality of instructions, which when executed, cause the one or more processors to:
receive one or more initial electronic documents, the electronic documents including respective portions of content comprising textual or audio data;
store the received one or more initial electronic documents in a data store device;
evaluate the one or more initial electronic documents to build a content profile based on detecting information at one or more of the respective portions of content that indicates a pre-defined category, from a plurality of different types of pre-defined categories, that corresponds to each of the one or more respective portions of content;
for each respective portion of content, apply at least one machine learning model that corresponds with the indicated pre-defined category of the respective portion to determine a probability value of whether the respective portion of content includes data considered likely to be privacy information, wherein a first type of machine learning model that corresponds with a first pre-defined type of category indicated for a first portion of content differs from a second type of machine learning model that corresponds with a second pre-defined type of category indicated for a second portion of content; and
recreate the one or more initial documents according to one or more privacy information redactions at respective locations of the respective portions of content;
wherein apply at least one machine learning model comprises: apply a pre-determined machine learning model for a financial business domain category to a header portion of a particular electronic document that includes content indicative of the financial business domain;
wherein determine a probability value comprises: determine, via application of the pre-determined machine learning model for the financial business domain category, a first probability value of whether the content in the header portion is considered to be financial privacy information;
wherein recreate the one or more initial documents according to one or more privacy information redactions comprises: generate a version of the particular electronic document to include a visual modification at a document position of the header portion, the visual modification obscuring the content indicative of the financial business domain.

10. The system of claim 9, wherein the one or more categories comprise:
a language category, a business domain category, an organizational category and a geographic category.

11. The system of claim 10, wherein evaluate the one or more initial electronic documents to build a content profile based on detecting information at the respective portions of content that indicates one or more pre-defined categories comprises:
determine a customer identifier associated with the one or more initial electronic documents;
identify a format for each initial electronic document prior to determining the one or more indicated pre-defined categories; and
upon determining the one or more indicated pre-defined categories, create an association between each respective portion of content, the respective portion of content's one or more indicated categories and the customer identifier.

12. The system of claim 9, wherein apply at least one machine learning model that corresponds with the indicated category comprises:
extract one or more structural data and attributes of a corresponding electronic document that includes the respective portion of content, wherein the one or more structural data and attributes represent a redaction location; and
send input based on the respective portion of content to the at least one machine learning model.

13. The system of claim 12, wherein extract one or more structural attributes comprises:
detect structural data and attributes based on one or more of: a sentence position, a document section, a header, a footer, a paragraph and a document table; and
wherein send input to the at least one machine learning model comprises: store the detected structural data and attributes outside of the machine learning model to pair it with the probability value.

14. The system of claim 13, wherein recreate the one or more initial documents according to one or more privacy information redactions at respective locations of the portions of content comprises:
locate a document position of privacy information based on corresponding portion of content and the stored structural data and attributes
identify the document position to be visually modified; and
generate a version of the corresponding electronic document with the visually modified document position to obscure the corresponding portion of content.

15. The system of claim 14, wherein generate a version of the corresponding electronic document with the visually modified document position comprises:
display the version of the corresponding electronic document with the visually modified document position;
receive a selection associated with the visually modified document position; and
in response to the selection, replace the visually modified document position with a display of the corresponding portion of content concurrently with display of the version of the document.

16. A computer program product comprising computer-readable program code to be executed by one or more processors when retrieved from a non-transitory computer-readable medium, the program code including instructions to:
receive one or more initial electronic documents, the electronic documents including respective portions of content comprising textual or audio data;
store the received one or more initial electronic documents in a data store device;
evaluate the one or more initial electronic documents to build a content profile based on detecting information at one or more of the respective portions of content that indicates a pre-defined category, from a plurality of different types of pre-defined categories, that corresponds to each of the one or more respective portions of content;
for each respective portion of content, apply at least one machine learning model that corresponds with the indicated pre-defined category of the respective portion to determine a probability value of whether the respective portion of content includes data considered likely to be privacy information, wherein a first type of machine learning model that corresponds with a first pre-defined type of category indicated for a first portion of content differs from a second type of machine learning model that corresponds with a second pre-defined type of category indicated for a second portion of content; and
recreate the one or more initial documents according to one or more privacy information redactions at respective locations of the respective portions of content;
wherein apply at least one machine learning model comprises: apply a pre-determined machine learning model for a financial business domain category to a header portion of a particular electronic document that includes content indicative of the financial business domain;
wherein determine a probability value comprises: determine, via application of the pre-determined machine learning model for the financial business domain category, a first probability value of whether the content in the header portion is considered to be financial privacy information;
wherein recreate the one or more initial documents according to one or more privacy information redactions comprises: generate a version of the particular electronic document to include a visual modification at a document position of the header portion, the visual modification obscuring the content indicative of the financial business domain.

17. The computer program product of claim 16, wherein the one or more categories comprise: a language category, a business domain category, an organizational category and a geographic category; and
wherein evaluate the one or more initial electronic documents to build a content profile based on detecting information at the respective portions of content that indicates one or more pre-defined categories comprises:
determine a customer identifier associated with the one or more initial electronic documents;
identify a format for each initial electronic document prior to determining the one or more indicated pre-defined categories; and
upon determining the one or more indicated pre-defined categories, create an association between each respective portion of content, the respective portion of content's one or more indicated categories and the customer identifier.

18. The computer program product of claim 16, wherein apply at least one machine learning model that corresponds with the indicated category comprises:
    extract one or more structural data and attributes of a corresponding electronic document that includes the respective portion of content, wherein the one or more structural data and attributes represent a redaction location; and
    send input based on the respective portion of content to the at least one machine learning model.

19. The computer program product of claim 18, wherein extract one or more structural attributes comprises:
    detect structural data and attributes based on one or more of: a sentence position, a document section, a header, a footer, a paragraph and a document table; and
    wherein send input to the at least one machine learning model comprises: store the detected structural data and attributes outside of the machine learning model to pair it with the probability value;
    wherein recreate the one or more initial documents according to one or more privacy information redactions at respective locations of the portions of content comprises:
    locate a document position of privacy information based on corresponding portion of content and the stored structural data and attributes;
    identify the document position to be visually modified; and
    generate a version of the corresponding electronic document with the visually modified document position to obscure the corresponding portion of content.

* * * * *